(12) United States Patent
Kowalski

(10) Patent No.: US 8,956,205 B2
(45) Date of Patent: Feb. 17, 2015

(54) METHOD FOR REMOVING BLOOD RELEASED DURING FILLETING FROM THE BACKBONE OF FISH, AND DEVICE FOR REMOVING SUCH BLOOD

(75) Inventor: Wolfhard Kowalski, Putte (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 14/131,934

(22) PCT Filed: Jul. 11, 2011

(86) PCT No.: PCT/EP2011/061746
§ 371 (c)(1),
(2), (4) Date: Apr. 28, 2014

(87) PCT Pub. No.: WO2013/007293
PCT Pub. Date: Jan. 17, 2013

(65) Prior Publication Data
US 2014/0227953 A1 Aug. 14, 2014

(51) Int. Cl.
*A22C 25/16* (2006.01)
*A22C 25/14* (2006.01)

(52) U.S. Cl.
CPC ................. *A22C 25/14* (2013.01); *A22C 25/16* (2013.01)
USPC .......................................................... 452/135

(58) Field of Classification Search
USPC ................. 452/135, 136, 149–153, 155, 156, 452/160–162
See application file for complete search history.

(56) References Cited

U.S. PATENT DOCUMENTS 4,037,294 A * 7/1977 Cowie et al. ................... 452/136
4,056,866 A * 11/1977 Wenzel .......................... 452/135

(Continued)

FOREIGN PATENT DOCUMENTS

| DE | 12 39 827 B | 5/1967 |
| DE | 17 79 485 A1 | 9/1971 |

(Continued)

OTHER PUBLICATIONS

PCT/EP2011/061746—International File Date: Jul. 11, 2011—International Search Report; Nordischer Maschinenbau Rud. Baader GmbH + Co. KG; 3 pages.

*Primary Examiner* — Richard Price, Jr.
(74) *Attorney, Agent, or Firm* — Sunstone IP

(57) ABSTRACT

In a method for removing blood released during filleting from the backbone and the indentations therein in the region of the vertebrae of fish that are conveyed in a row with the head forwards and the belly downwards, the removal of blood is carried out at the same time and in the same place as the cutting of the backbone. The backbone, which is freed of ray bones and rib bones, is guided through a cutting gap and is cut clear on the belly side of the fish over the entire length of the fish as far as the root of the dorsal fin to leave a backbone stump. The fish fillet flesh is covered by covering surfaces which converge at the cutting gap and of which at least two covering surfaces form the cutting gap. Pressurized cleaning fluid is sprayed onto the backbone that is guided between the covering surfaces through the cutting gap during cutting. A device for removing said released blood comprises a backbone cutting device having two backbone cutting circular blades, which are arranged obliquely in an inverted V shape and form the covering surfaces, and having fish guiding means forming covering surfaces that cover the fish fillet flesh. A cleaning device comprises at least one cleaning nozzle aligned with the cutting gap. An actuating device actuates the cleaning device and the backbone cutting device simultaneously. The covering surfaces protect the fish fillet flesh from being sprayed with the cleaning fluid.

21 Claims, 7 Drawing Sheets

(56) References Cited

U.S. PATENT DOCUMENTS

Figure 1A:
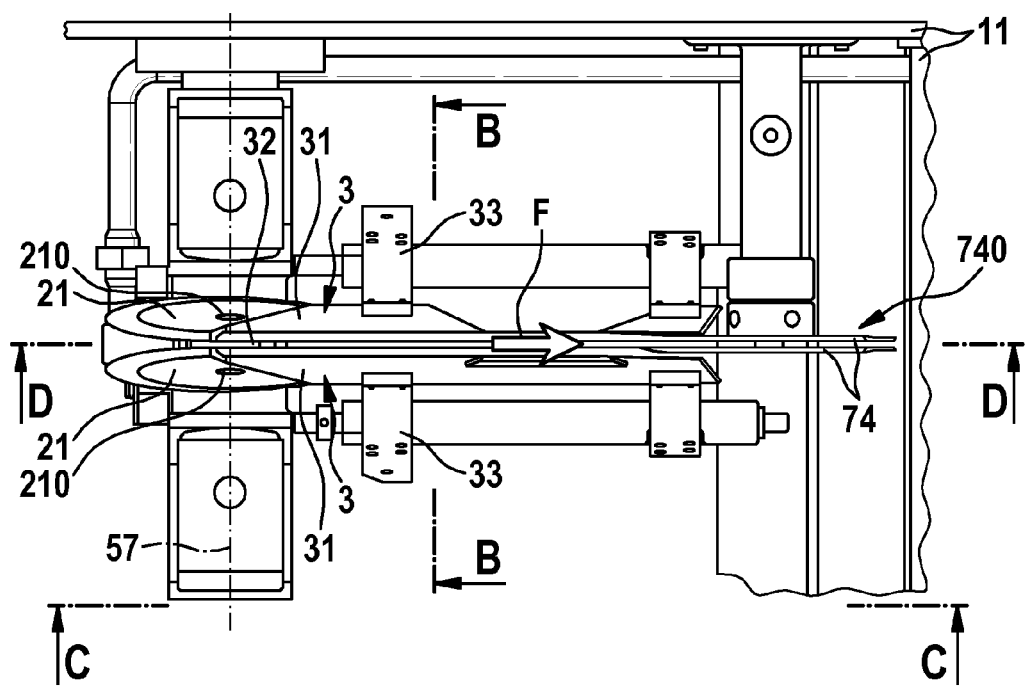

| | | | |
|---|---|---|---|
| 4,336,634 A * | 6/1982 | Braeger | 452/135 |
| 4,535,509 A | 8/1985 | Bullock et al. | |
| 4,748,721 A * | 6/1988 | Braeger | 452/127 |
| 4,748,723 A * | 6/1988 | Braeger et al. | 452/122 |
| 5,800,052 A * | 9/1998 | Yeh | 362/376 |
| 6,200,211 B1 * | 3/2001 | Braeger et al. | 452/162 |
| 6,280,313 B1 * | 8/2001 | Braeger et al. | 452/161 |
| 6,322,437 B1 * | 11/2001 | Grabau et al. | 452/161 |
| 6,994,617 B2 * | 2/2006 | Jakobsen et al. | 452/161 |
| 7,090,574 B2 * | 8/2006 | Braeger et al. | 452/162 |
| 7,927,194 B2 * | 4/2011 | Jurs et al. | 452/135 |

FOREIGN PATENT DOCUMENTS

| | | |
|---|---|---|
| DE | 103 41 941 B3 | 12/2004 |
| DE | 10 2005 009034 B3 | 3/2006 |

\* cited by examiner abdominal cut side cut rib bone cut

METHOD FOR REMOVING BLOOD RELEASED DURING FILLETING FROM THE BACKBONE OF FISH, AND DEVICE FOR REMOVING SUCH BLOOD

FIELD OF TECHNOLOGY

The invention concerns a method for removing blood released from the backbone and its indentations in the region of the vertebrae during filleting of fish fed head-first in a row with belly downwards, and a device for removing such blood.

BACKGROUND

Methods and procedures are known for the beheading, gutting and subsequent filleting of whitefish as well as sea trout belonging to the Salmonidae family. Basically, a head cut takes place first, in which the head is separated with the collarbone. Guts are removed, and the fish and/or fish parts prepared in this manner are conveyed in a row head-first and belly downwards and processed for filleting with the following steps: the abdominal cavity is opened from below with an abdominal cut, wherein the lower ray bones are cut free from the end of the abdominal cavity to the end of the tail root; the side parts of the fish are separated from the rib bones with a side cut; the rib bones are separated from the backbone by means of a rib bone cut; the backbone is cut free from below up to the dorsal fin roots over the entire length of the fish by means of a backbone cut, wherein the backbone stump produced is still connected with the back meat and the fish fillets are still connected together; a strip including the dorsal fins is cut out on the back side of the fish. Two individual fillets are produced in the last step. The backbone occurs as a backbone stump with the meat clinging to it and, in the conventional process, with a considerable quantity of blood. It is guided to a separation process to recover the remaining meat. The separation process comprises a complex washing process in which impurities, in particular blood, must be flushed out. Blood entering the separated fish meat considerably affects the colour of the fish meat and leads to germ contamination. As a consequence of this, during the separation process, the separated fish meat must be cleaned with the effort described to remove to a large extent the blood influencing the colour of the fish meat and sufficiently reduce germ contamination.

SUMMARY

Thus, the objects of the invention consist of reducing to a great extent the effort for the washing process to be performed during the separation process by significantly reducing entry of blood into the separated fish meat. This is intended to counteract the influence on colour as well as germ contamination of the separated fish meat a priori to a considerable degree.

According to the invention, the objects are achieved by a method for removing blood released during filleting from the backbone and its indentations in the region of the vertebrae of fish fed head-first in a row in a conveying direction with belly downwards, each having a torso which is separated from the head, including the collarbone, and at least essentially freed of guts, wherein said removal of blood is performed at the same time and place as a backbone cut such that the backbone freed of ray bones and rib bones is guided through a cutting gap and in this process is cut free over the entire length of the fish on the belly side of the fish down to the dorsal fin roots to leave a backbone stump, wherein the fish fillet meat is covered by covering surfaces converging at the cutting gap, of which at least two covering surfaces form the cutting gap, and wherein pressurised cleaning fluid is sprayed on the backbone guided through the cutting gap between the covering surfaces while it is cut free. Preferably fish of the whitefish and sea trout family are filleted and subjected to the method according to the invention.

Similarly, the objects described are achieved according to the invention by a device for removing blood from the backbone and its indentations in the region of the vertebrae of fish able to be conveyed in a row while they are filleted, in particular to carry out the method according to the invention, with the fish each having a torso which is separated from the head, including the collarbone, and at least essentially freed of guts, wherein the device comprises a backbone cutting device designed for cutting the backbone free along the entire length of the fish on the belly side from below to the dorsal fin roots with means of conveyance to convey the fish head-first, two roof-shaped backbone circular knives arranged at an angle, which form covering surfaces covering the fish fillet meat and a cutting gap for cutting free the backbone which comes to lie in the cutting gap, and means of guidance for guiding the fish in the area of the backbone circular knives, wherein the means of guidance cover the two backbone circular knives with guiding components which form covering surfaces covering the fish fillet meat and leave a guiding gap corresponding to the cutting gap, whereas the device has a cleaning device which is designed with at least one cleaning nozzle spraying cleaning fluid, said nozzle being arranged between the two backbone circular knives and aligned to the cutting gap of the two backbone circular knives in the area of the guiding gap of the guiding components, wherein the covering surfaces protect the fish fillet meat from spraying with cleaning fluid, and wherein the device comprises an actuating device which simultaneously actuates the cleaning device for spraying the cleaning fluid as well as the backbone cutting device for cutting the backbone free.

According to the invention, it is a significant advantage that each backbone stump is largely cleaned of blood before the conclusion of the filleting process, i.e. before being guided further to the separation process. According to the invention, this works in that while the backbone is cut free to the stump along the entire length of the fish, advantageously remaining connected with back meat of the fish in the process, the backbone is sprayed with pressurised cleaning fluid at the same time as it is cut free such that a spray is directed at the backbone and thus concentrated on it on the belly side from below. Here an important measure in combination is that the fillet meat of the fish is not exposed to spray from at least one cleaning nozzle for spraying during spraying of the backbone with cleaning fluid. While the backbone to clean is guided through the cutting gap and cut free in the process over the entire length of the fish on the belly side of the fish down to the dorsal fin roots to leave a backbone stump, simultaneous spraying of the backbone stump occurring from the cut takes place with cleaning fluid. The spray of cleaning fluid emitted under pressure by at least one spray nozzle is effective to a particular degree as such, because it concentrates on the backbone stump while it is cut and due to the strength of the spray produced in the process, blood is flushed with particular effectiveness not only from the surface of the backbone, but also from its indentations in the region of the vertebrae. The covering of the fish fillet meat is such that covering surfaces converge at the cutting gap to form and limit the cutting gap as well as keep the nozzle spray away from the fish fillet meat. With respect to these measures, the device for removing blood according to the invention comprises the cleaning device which is designed with at least one cleaning nozzle spraying cleaning fluid, said nozzle being arranged between the two backbone circular knives of the backbone cutting device and aligned to the cutting gap of the two backbone circular knives in the area of the guiding gap of the guiding components. This results in that the known roof-shaped, backbone circular knives arranged at an angle forming said covering surfaces, which cover the fish fillet meat. Moreover, the means of guidance with the two backbone circular knives also known as such form further covering surfaces with their guiding components, which keep the spray from the fish fillet meat. Said actuating device is designed to simultaneously effect cutting free the backbone to the stump and the cleaning spray which is directed onto the stump. Such an actuating device is part of a control device which controls the actuation of parts and tools at the right time and location in a known manner at processing positions using control elements. Such operational control includes an operating control computer working in programmed combination with fish data determined for each fish fed.

Water is used preferably as the cleaning fluid, to which a solvent approved for food products can be added, as necessary.

Methods and means are known from DE 103 41 941 B3 and DE 10 2005 009 034 B3 for controlled machine processing of beheaded, gutted whitefish. However, the known methods and means do not concern filleting processes of the kind which the invention takes as a starting point. Thus, the known methods and means described depend on the beheaded and gutted fish still having a collarbone on which exposed neck blood is to be removed. There, cleaning devices with nozzles are arranged after the cutting processes and work with high-pressure sprays of water. On one hand, collarbones and fish membranes are used for protective covering of fish meat from the water spray, and on the other hand removal of blood residues on the fish meat is limited by regulated high-pressure spray.

The spray of liquid according to the invention starts at a place and/or time preferably directly at the beginning of the cut freeing the backbone from below and on the sides. In the area of the cutting gap belonging to the beginning of the cut or to the progressing cut, the area lying ahead in the direction of conveyance (located upstream), the backbone which has been cut free is secured, held and guided in a particularly stable manner, i.e. particularly effectively against diversion under high-pressure liquid spraying. The cutting gap is understood to be the gap with a length over which the backbone which is cut free is located between the cutting tools producing the cut.

Expediently, the spraying at the front area of said cutting gap is particularly concentrated or limited. Advantageously, at least one cleaning nozzle is arranged above an imagined horizontal plane and/or in the area in the direction of conveyance after as well as near an imagined vertical plane to concentrate the spraying on said front area of the cutting gap. The horizontal plane and the vertical plane are each spanned by rotation centres of a pair of backbone circular knives. The horizontal plane is perpendicular to the symmetry/centre plane of the backbone circular knives. The vertical plane is perpendicular to the horizontal plane.

According to a preferred embodiment of the invention, the backbone is cleaned transversely with a transverse spray of cleaning fluid. The cleaning device is designed with at least one cleaning nozzle for transverse spraying. The nozzle can be equipped with a suitable shaped outlet, for example with a flat spray gap oriented transversely with respect to the backbone. A back-and-forth movement arrangement of the cleaning spray nozzle crossing the backbone can also be provided. Expediently, at least one cleaning nozzle can also rotate and/or be movable with changing height or be designed with a drive arranged for that respective purpose. Corresponding measures can be provided if instead or additionally the backbone is to be cleaned lengthwise with a longitudinal spray.

Preferably, the cleaning fluid is sprayed continuously on the backbone in the cutting gap. This includes that the cleaning fluid can be sprayed in a pulsed manner. It can also be expedient for rinsing with the high-pressure spray that the cleaning fluid be sprayed on the backbone and the cutting gap at pressure varying with time and thus with location to increase the spray at selected positions of the backbone stump, particularly in the area of particular indentations of the vertebrae.

Advantageously, the cleaning device has at least two specified cleaning nozzles which are arranged offset in the longitudinal direction of the cutting gap. The offset cleaning nozzles can be used in particular to perform spraying with a sequentially varying spray pattern and/or spray pressure.

In a preferred arrangement, at least one specified cleaning nozzle of the cleaning device is arranged in a knife centre plane equally spaced with respect to the two backbone circular knives of the backbone cutting device.

Even if preference is given in the process to continuous, possibly even pulsed spraying of the backbone cut to the stump, it is also conceivable, not only in additional, but instead, to design the spraying during the cutting operation to be limited in a synchronised or time-dependent manner, especially intermittently, if applicable even to reduce water consumption.

Cleaning the backbone according to the invention is enough in itself to ensure that the entry of blood in the material for separation is significantly reduced if the cleaning fluid which accumulates together with the blood removed from the backbone is collected in a separation process producing the material for separation or fed to it together with the backbone stump.

However, after separation, particularly advantageously each backbone is conveyed away as a backbone stump on a first path while the cleaning fluid which accumulates together with the removed blood is conveyed away on a second path separate from the first path. The device for blood removal is then correspondingly equipped with a discharge device which comprises a discharge path on which the cleaning fluid which accumulates can be conveyed away with the removed blood free of separated fish parts.

The embodiments described and other expedient and advantageous embodiments of the invention are covered by dependent claims. Only particularly expedient and advantageous designs and options are described in more detail based on the description below of the exemplary embodiments represented in the schematic drawing. Each individual or detailed design described in an exemplary embodiment is to be understood as an independent detail example for other embodiments and designs in the scope of the invention which are not described or described incompletely.

BRIEF DESCRIPTION

These show in

Figure 1B:
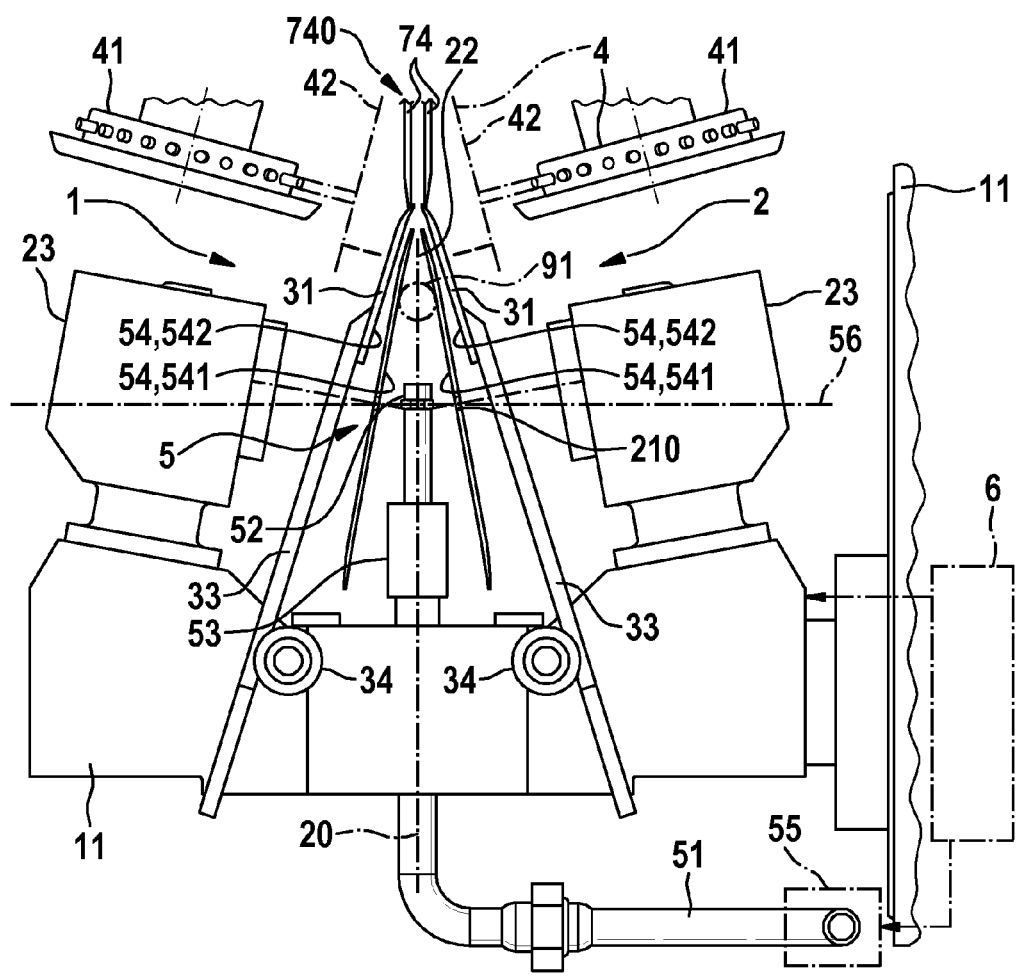
Figure 1C:
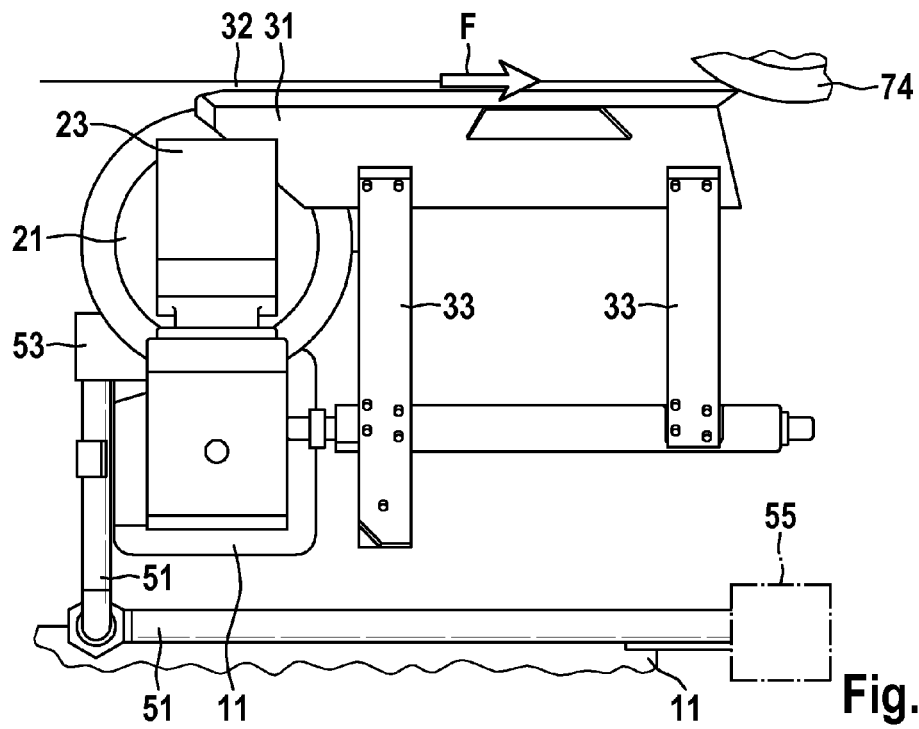
Figure 1D:
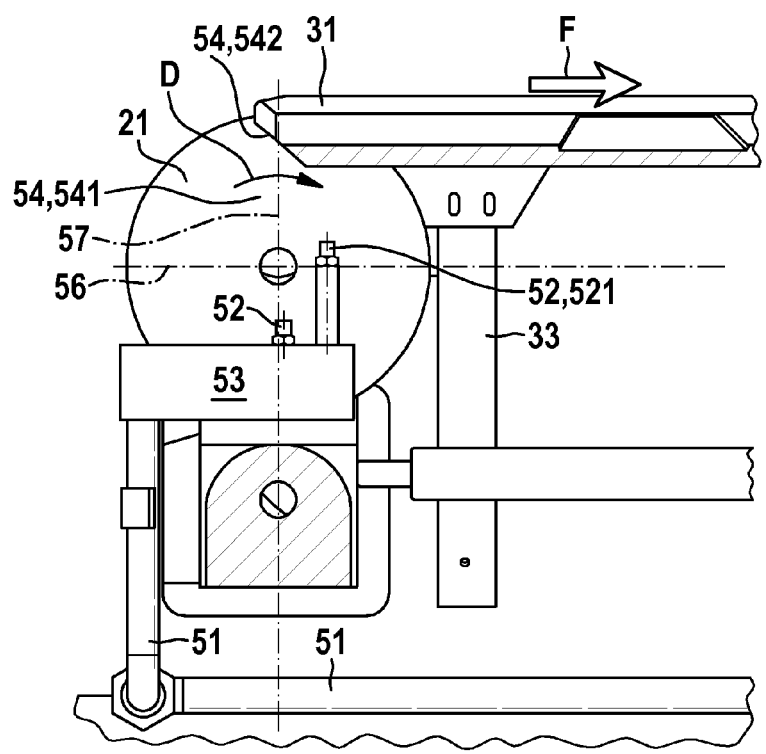
Figure 2:
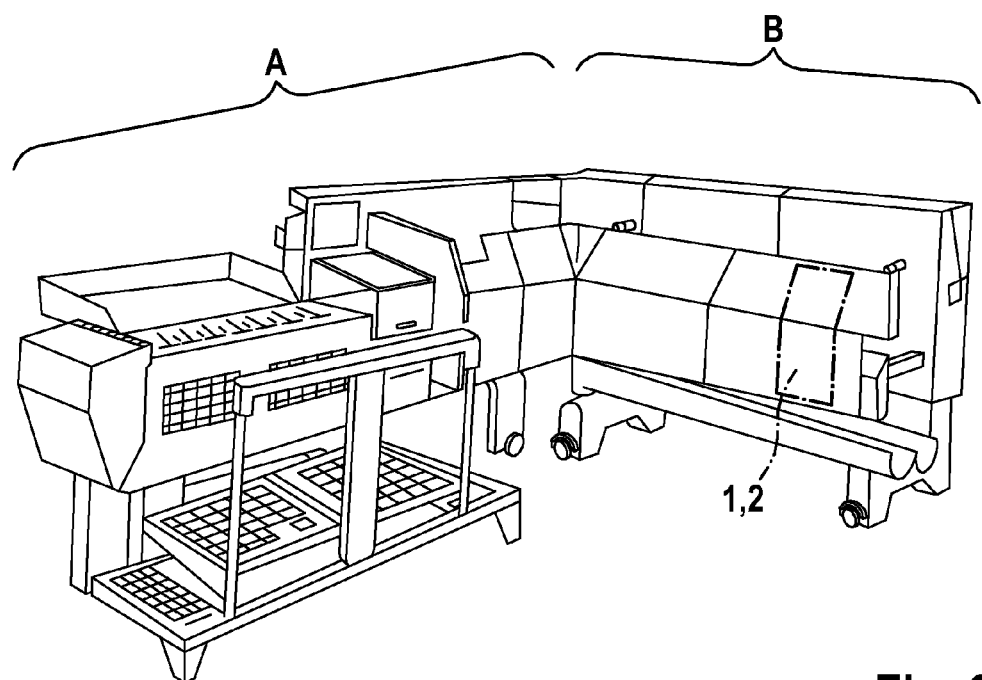
Figure 3A:
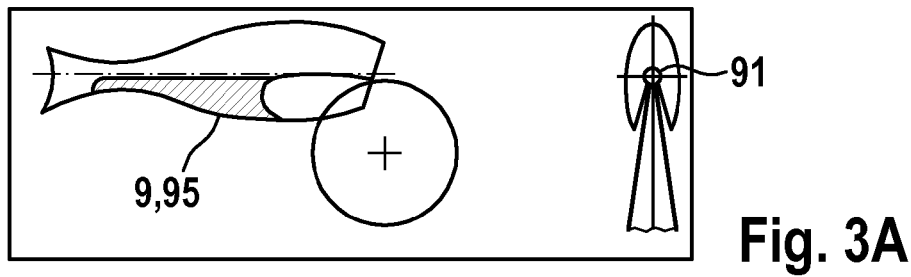
Figure 3B:
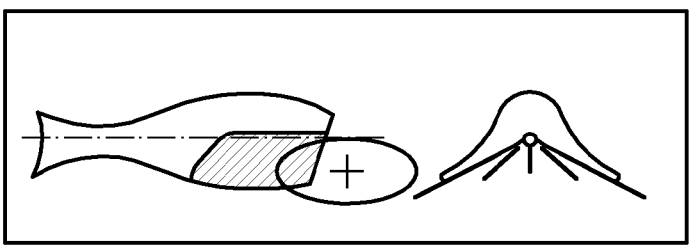
Figure 3C:
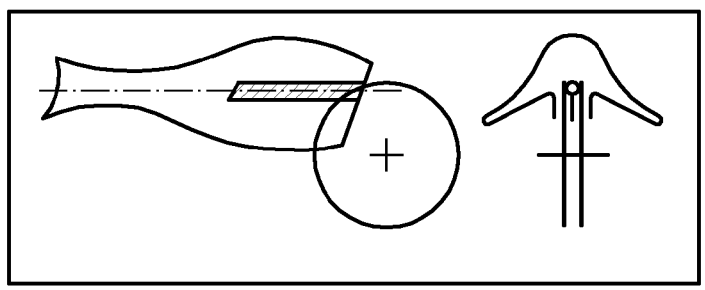
Figure 3D:
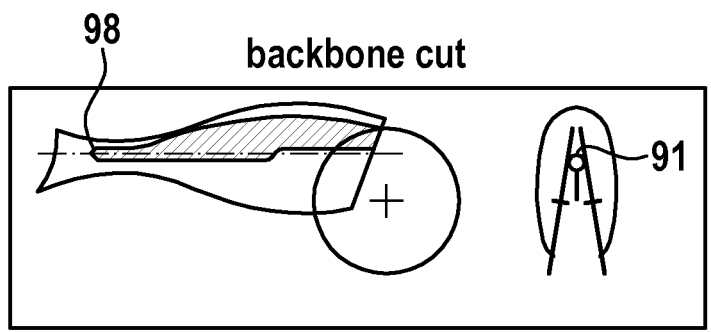
Figure 3E:
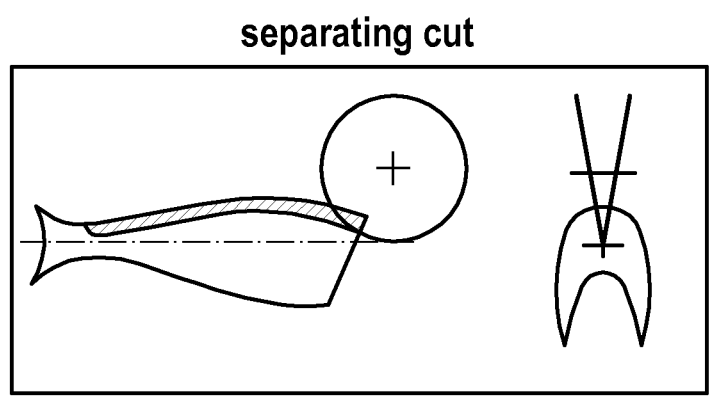
Figure 4:
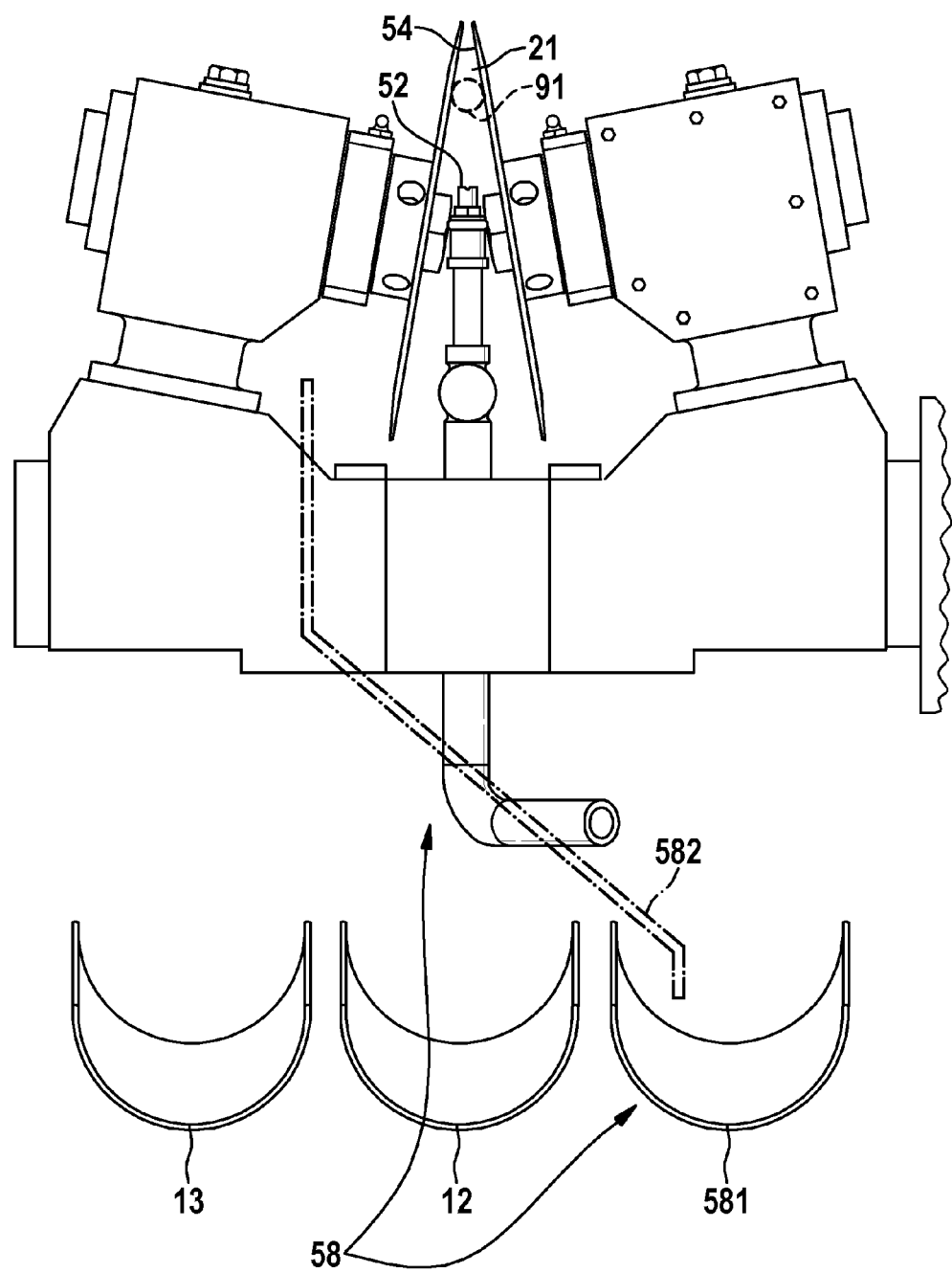

FIG. 1A to 1D a device according to the invention in a top view and views corresponding to the lines B-B, C-C and D-D in FIG. 1A, FIG. 2 a fish processing machine in an axonometric view with a section A for beheading and gutting and a section B for filleting whitefish and the place of arrangement for a device according to the invention in section B of the machine, FIG. 3A to 3E phases of processing during filleting and FIG. 4 in the view corresponding to FIG. 1B, a device according to the invention with a discharge device which collects cleaning fluid and conveys it away.

DETAILED DESCRIPTION

A blood removal device 1 according to FIG. 1A to 1D is designed on a backbone cutting device 2, wherein parts of the backbone cutting device 2 constitute components of the blood removal device 1.

The backbone cutting device 2 comprises two backbone circular knives 21 rotationally driven in a manner known in itself, which stand opposite one another in a roof-shaped arrangement, wherein they are symmetrical to a symmetry plane of the knife centre plane 22 formed by the two circular knives 21, with respect to which they are equally spaced. The backbone circular knives 21 include a cutting gap 22 in their upper area on the device 1, in which the backbone 91 of a fish to be filleted (FIG. 3A to 3D), indicated only by a dashed line, comes to lie (FIG. 3D) during a backbone cut performed with the backbone circular knives 21. The drawing shows gear housings 23 which are connected to the backbone circular knives 21 by parts not shown for driven rotation. The device 1 comprises a frame and/or other bearing parts 11, such as drive housings, to arrange or bear parts and assemblies of the devices 1 and 2. The backbone cutting device 2 is arranged downstream in the direction of fish conveyance F of a separation cut device 740 which has two circular knives 74 for a separating cut, which completes filleting and produces two individual fillets. The circular knives for the separating cut can be arranged in parallel (FIG. 1B) or in a V shape (FIG. 3E). As shown in FIG. 1D, it is expedient to operate the backbone circular knives 21 during cutting with a direction of rotation D in the direction of fish conveyance F.

The blood removal device 1 or the backbone cutting device 2 have a means of guidance 3 with plate-shaped guiding components 31 which overlap the backbone circular knives 21 from a position starting directly before or in the cutting vertex area of the backbone circular knives 21 and extend up to the separation cut device 740. The guiding components 31 guide the fish 9 to be processed on its belly side. They form a roof-shaped covering over the backbone circular knives 21, wherein a guiding gap 32 remains between the roof-shaped guiding components 31 which come together at a point. The backbone 91 is held in a guided manner within the cutting gap 22 by means of the guiding components 31. The backbone 91 is covered there towards the top, i.e. towards the meat- and back-side of the fish 9, by the backbone circular knives 21 which come together at an angle as well as by the guiding components 31 which are at an angle and come together symmetrically with respect to the knife centre plane 20. The guiding components 31 are arranged on mounts 33 which can particularly be pivoted on axes 34 while ensuring coverage. Fish 9 are conveyed head-first with belly downward in a conveying direction F between rotating transport chains, spike conveyor chains 42 in the example. The spike conveyor chains 42, which run over chain guide rollers 41, are only indicated by dashes.

In the exemplary embodiment, the cleaning device 5 comprises two cleaning nozzles 52 which, as seen from FIGS. 1B and 1D, are situated between the two backbone circular knives 21. The two cleaning nozzles 52 are situated in the knife centre plane 20 and aligned with it, wherein, viewed from the direction of fish conveyance F, a front first cleaning nozzle 52 and a subsequent downstream back cleaning nozzle 521 are located, the latter of which is higher and located closer to the cutting gap 22 and opposite the first one. Both cleaning nozzles 52 are covered completely by the two backbone circular knives 21, wherein they are also covered above by the guiding components 31 of the means of guidance 3. In the embodiment example, the cleaning nozzles 52 are situated between the backbone circular knives 21 in the back area of the backbone circular knives 21 running under the guiding components 31. This is the front area of the cutting gap 22 associated with the progressive cut in the direction of conveyance F. The cleaning nozzle 521 is located above a horizontal plane 56 spanned by the rotation centres 210 of the backbone circular knives 21 and perpendicular to the knife centre plane 20. Viewed in the direction of conveyance F, both cleaning nozzles 52 are arranged behind and near an imagined vertical plane 57, which is spanned by the rotation centres 210 and oriented perpendicular to the horizontal plane 56. The cleaning nozzles 52 are directed at the front area of the cutting gap 22, i.e. upstream, in which the backbone 91 is progressively cut free.

The cleaning nozzles 52 are equipped with shaped nozzle outlets not represented in more detail, which, in the exemplary embodiment, both produce a spray pattern directed transversely to the extension of the backbone 91. For example, flat spray nozzles can be configured which produce a flat spray directed transversely to the backbone 91, said spray being aimed at the cutting gap 22 in which the backbone 91 comes to lie.

In the exemplary embodiment both cleaning nozzles 52 are situated on a water distributor 53 which charges the cleaning nozzles 52 with pressurised cleaning fluid, in particular with water supplied through a feed line 51. It is important that the cleaning nozzles 52 spray the cleaning fluid with a relatively focused high-pressure spray directed at the cutting gap 22. This measure is such and works so that the backbone 91 is reliably freed of blood by spray rinsing even in indentations in the area of vertebral bones, namely while the backbone cut is performed by means of the backbone cutting device 2 at the same time and place as spray cleaning.

The device 1 includes an actuating device 6, which is represented only schematically by dashes, which can be formed by a section or part of an ordinary operation control computer of a fish processing machine. The actuating device 6 brings about simultaneous spraying of the cleaning fluid from the cleaning nozzles 52 and the execution of the backbone separation cut by means of the backbone circular knives 21. In particular, the simultaneous spraying and execution of the cut can particularly be enabled and/or disabled. For example, the actuating device 6 can control a magnet valve device 55 for charging the cleaning nozzles 52 with pressurised water. Magnet valve nozzles can also be advantageously assigned to cleaning nozzles individually. The operating/control computer of a fish processing machine is operated with measured fish data, such as head thickness measurement, and stored species-specific fish data for producing control signals to operate the units of the device or the machine. The measurement of each fish is the basis for all controlled tool movements and unit actuation, particularly by step motors.

The high-pressure spray of fluid can be produced in various ways. For example, a source of pressurised water, not shown, such as a pump, can be provided to feed the water distributor 53. The cleaning sprays which are sprayed from the cleaning nozzles 52 can be determined not only in shape but also with respect to spray force by spray angle orientation and cross-section, for example spray flatness. In each case, it depends on the nozzle characteristics with high-pressure effect, not on a pressure source (not shown) as such, which can also advantageously be a low pressure source.

One recognises that both the backbone circular knives 21 and the guiding components 31 form covering surfaces 54, namely knife covering surfaces 541 and guide covering surfaces 542, which reliably and extensively keep the high-pressure water spray directed at the cutting gap 22 or the backbone 91 away from the fish fillet halves still attached to the backbone 91 so that the fish fillet meat is not damaged by the cleaning spray.

The invention is explained in relation to the filleting process, which is known in itself for whitefish or sea trout, for example, based on FIG. 2 as well as 3A to 3E. FIG. 2 shows a machine for beheading, gutting and filleting whitefish. The machine has a section A in which the fish to be processed are placed parallel next to each other in troughs, and are beheaded and gutted. The fish are transferred for filleting to a section B in which they are fed one after another in a row head-first and belly downwards for a sequence of cuts. The cut sequence is shown in FIG. 3A to 3E.

First the abdominal cavity is opened from below (FIG. 3A) using an abdominal cut, wherein two circular knives cut lower ray bones free up to the backbone 91 from the end of the abdominal cavity to the tail root 98. A subsequent side cut is performed to separate the fish meat on the belly flaps from rib bones, said rib bones remaining connected to the backbone 91, thereby forming a skeleton in the process (FIG. 3B). The rib bones are then separated from the backbone 91 (FIG. 3C) by means of a rib bone cut. Then the backbone cut is performed. In the backbone cutting device 2 already described based on the exemplary embodiment according to FIG. 1A to 1D, the two backbone circular knives 21 cut the backbone 91 free from below up to the dorsal fin roots 98 along the entire length of the fish. This cut is used to produce a complete backbone stump with remainders of the abdominal cavity contour and the exposed vertebrae. The backbone stump is still connected with the back meat towards the back side of the fish. A pin bone cut or belly flap cut (not shown) can follow the backbone cut (stump cut). A separating cut (FIG. 3E) takes place at the end of the filleting process. Two circular knives cut a strip with the dorsal fins from the fish from above. Two fish fillet halves (individual fillets) are produced. The separation cut device 740 is provided in the exemplary embodiment according to FIG. 1A to 1D.

The inventive measure is that part of the backbone cutting device 2 performing the backbone cut is designed as a cleaning device 5 is of particular importance as this is essentially described in general and beforehand in the exemplary embodiment. It is found that the backbone stump (backbone 91), with the back meat still connected and thus attached during the backbone cut, can be rinsed and cleaned with particular thoroughness by means of the high-pressure liquid spraying previously described. The cleaning occurs while the backbone stump is cut. The fish fillet meat is kept free of damaging liquid spray due to the arrangement of cleaning nozzles 52 and covering of the fish fillet meat by means of the knife surfaces of the backbone circular knives 21, on the one hand, and by the fish guiding components 31, on the other. The cleaning of the backbone stump according to the invention takes place directly or where required only with an intermediate pin bone/belly flap cut before the separating cut in the back of the fish (FIG. 3E).

The cleaned backbone stump is conveyed away directly after the back separation cut, i.e. promptly after cleaning as well as promptly after the end of the filleting process, and guided further to the separation process. FIG. 2 shows a discharge trough. The entry of blood in the separated fish meat (material for separation) is significantly reduced a priori due to the cleaning according to the invention. Washing of the material for separation is significantly reduced and simplified to achieve the original colour and thus the desired meat quality.

Expediently, the cleaning fluid sprayed off the backbone stump and covering surfaces 54 together with the removed exposed blood removed can be collected and conveyed away at least for the most part in the course of cleaning. FIG. 4 shows three discharge paths in the form of troughs 12, 13 and 581, which extend parallel adjacent to each other with a downward slope in the direction of conveyance F. The trough 12 is arranged in the centre and receives the parts separated by the aforementioned separating cuts with the exception of the parts incurred from a possible pin bone/belly flap cut. Trough 13 is allocated for the latter. Trough 581 is designed and arranged in connection with a discharge area 582 shown only with dashes. The discharge area 582 has an incline oriented transversely to the direction of fish conveyance F as well as to trough 581. A collection or receiving section of the discharge area 582 located in the space below the covering surfaces 54 and the cutting gap 22 collects the cleaning fluid or the removed blood sprayed off, flowing and/or dripping off the covering surfaces 54 and backbone stump in the course of cleaning, said blood and cleaning fluid entering trough 581 via a transfer section of the discharge area 582 allocated to it. One recognises that trough 581 and the discharge area 582, for example in the form of a flat sheet provided if applicable with a flow trough, form a discharge device 58, which keeps the cleaning fluid with the blood removed from the backbone 91 away from the separation process. Each separated backbone stump is guided to the separation process via the trough 12.

The invention claimed is:

1. Method for removing blood, released during filleting, from the backbone of a fish and the indentations of the backbone of the fish in the region of the vertebrae of the fish, wherein the fish has a torso which is separated from the head, including the collarbone, and at least essentially freed of guts, the method comprising the steps of:
feeding the fish head-first in a conveying direction with the belly of the fish facing downwards,
guiding the fish freed of ray bones and rib bones through a cutting gap,
cutting the backbone of the fish over the entire length of the fish on the belly side of the fish down to the dorsal fin roots of the fish thereby leaving a backbone stump,
covering fillet meat of the fish by covering surfaces converging at the cutting gap, wherein at least two covering surfaces form the cutting gap, and
spraying pressurised cleaning fluid on the backbone guided through the cutting gap between the covering surfaces while the backbone is cut clear, such that the removal of blood is performed at the same time and place as the cutting of the backbone.

2. Method according to claim 1, characterised in that the backbone is cleaned transversely with a transverse spray of cleaning fluid.

3. Method according to claim 1, characterised in that the backbone is cleaned longitudinally with a longitudinal spray of cleaning fluid.

4. Method according to claim 1, characterised in that the cleaning fluid is sprayed continuously on the backbone in the cutting gap.

5. Method according to claim 1, characterised in that the cleaning fluid is sprayed on the backbone in the cutting gap in a pulsed manner.

6. Method according to claim 1, characterised in that the cleaning fluid is sprayed on the backbone in the cutting gap with pressure varying with time.

7. Method according to claim 1, characterised in that the spray of cleaning fluid is concentrated on the front area of the cutting gap, viewed in the conveying direction.

8. Method according to claim 1, characterised in that after the backbone cut a separation cut is performed which completely separates the backbone stump from the fish, wherein during the backbone cut the backbone cut to the backbone stump and still connected to back meat of the fish is cleaned by spraying with cleaning fluid with the fish fillet meat covered.

9. Method according to claim 8, characterised in that each separated backbone stump is conveyed away on a first path and that the cleaning fluid which accumulates together with the blood removed from the backbone during cleaning are conveyed away on a second path separate from the first path.

10. Device for removing blood from the backbone of a fish and the indentations of the fish in the region of the vertebrae of the fish to be filleted and conveyable in a row while the fish is filleted, in particular for performing the method according to claim 1, wherein the fish has a torso which is separated from the head, including the collar bone, and at least essentially freed of guts, wherein the device comprises:
- a backbone cutting device adapted to cut the backbone clear along the entire length of the fish on the belly side from below to the dorsal fin roots with conveying means to convey the fish head-first,
- two roof-shaped backbone circular knives arranged at an angle, which form covering surfaces covering the fish fillet meat and a cutting gap for cutting free the backbone which comes to lie in the cutting gap,
- guiding means for guiding the fish in the area of the backbone circular knives, wherein the guiding means cover the two backbone circular knives with guiding components which form covering surfaces covering the fish fillet meat and leave a guiding gap corresponding to the cutting gap,
- a cleaning device having at least one cleaning nozzle adapted for spraying cleaning fluid, said nozzle being arranged between the two backbone circular knives and aligned to the cutting gap of the two backbone circular knives in the area of the guiding gap of the guide components, wherein the covering surfaces protect the fish fillet meat from spraying with cleaning fluid, and
- an actuating device which simultaneously actuates the cleaning device for spraying the cleaning fluid as well the backbone cutting device for cutting the backbone free.

11. Device according to claim 10, characterised in that at least one specified cleaning nozzle of the cleaning device is arranged and designed such that the cleaning nozzle sprays the backbone, which has been cut clear and has come to lie in the cutting gap, with cleaning fluid in a direction transverse to the backbone.

12. Device according to claim 10, characterised in that at least one specified cleaning nozzle of the cleaning device is arranged and designed such that the cleaning nozzle sprays the backbone, which has been cut clear in the cutting gap, with cleaning fluid in a direction longitudinal to the backbone.

13. Device according to claim 11, characterised in that the specified cleaning nozzle for transverse spraying or respectively longitudinal spraying of the backbone which has been cut clear is designed as a nozzle with a shaped outlet which produces a corresponding spray pattern for the transverse or respectively longitudinal direction.

14. Device according to claim 10, characterised in that the cleaning device has at least two specified cleaning nozzles which are arranged offset in the longitudinal direction of the cutting gap.

15. Device according to claim 10, characterised in that at least one specified cleaning nozzle of the cleaning device is arranged in a knife centre plane equally spaced with respect to the two backbone circular knives of the backbone cutting device.

16. Device according to claim 10, characterised in that at least one cleaning nozzle is arranged above a horizontal plane which is spanned by rotation centres of the backbone circular knives and positioned perpendicular to a symmetry plane of the two backbone circular knives.

17. Device according to claim 10, characterised in that the actuating device is adapted for operating a continuous spray of cleaning fluid from at least one first specified cleaning nozzle of the cleaning device.

18. Device according to claim 17, characterised in that the actuating device produces the continuous spray of cleaning fluid in a pulsed manner.

19. Device according to claim 10, characterised in that the actuating device is designed for operating a synchronised or temporally limited spray of cleaning fluid from at least one specified cleaning nozzle.

20. Device according to claim 10, characterised in that the actuating device is designed for operating a spray of fluid subject to pressure which varies with time from at least one specified cleaning nozzle of the cleaning device.

21. Device according to claim 10, characterised in that the cleaning device comprises a discharge device which receives at least the majority of the cleaning fluid which accumulates together with the blood removed from the backbone during cleaning and conveys accumulated cleaning fluid and blood away separately from the backbone stump.

* * * * *